B. B. Wescott,
Washing Machine,
N° 27,849.
Patented Apr. 10, 1860.

Witnesses.
C. M. Alexander
A. A. Yeatman

Inventor.
B B Wescott

UNITED STATES PATENT OFFICE.

B. B. WESCOTT, OF CAMDEN, INDIANA.

WASHING-MACHINE.

Specification of Letters Patent No. 27,849, dated April 10, 1860.

*To all whom it may concern:*

Be it known that I, B. B. WESCOTT, of Camden, in the county of Carroll and State of Indiana, have invented certain new and useful Improvements in Washing-Machines; and I do hereby declare that the following is a full, clear, and exact description of the same, reference being had to the accompanying drawings and to the letters of reference marked thereon.

The nature of my invention consists in constructing and arranging the several parts of my machine substantially in the manner hereinafter set forth.

Figure 2:
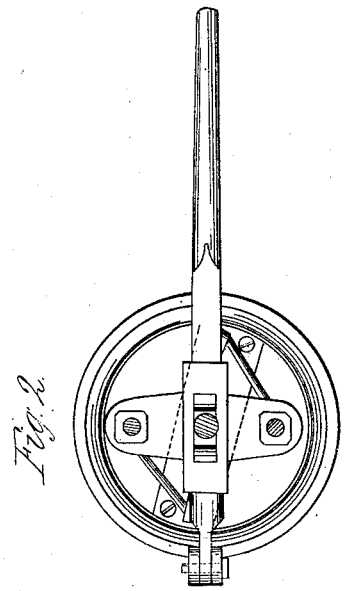
Figure 1:
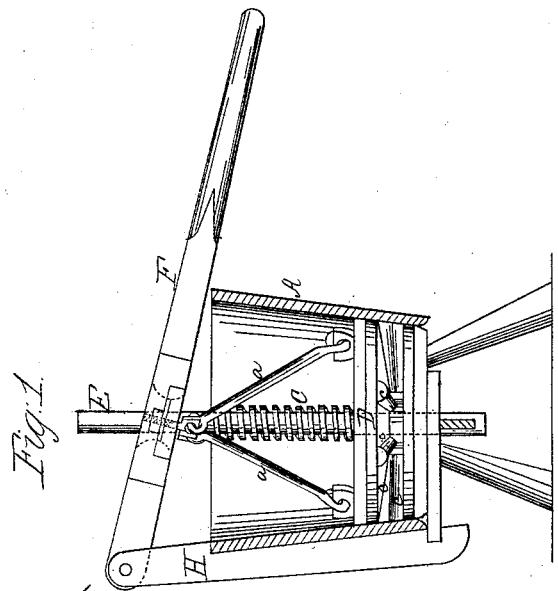

In the annexed drawings Figure 1 represents a vertical section. Fig. 2 represents a top view.

In the figures, A represents an ordinary round tub, secured upon legs, and made of any suitable size. E represents a standard which is erected from the center of this tub and which extends above its top.

D, represents the rubber, which is made round, and to fit loosely in the tub. The bottom of this rubber, and also the bottom of the tub is provided with radial arms $c, c, c$, as is generally the case in this class of washing machines.

H, represents a support which is attached to one side of the box as seen.

F, is a lever, one end of which is hinged to the support H.

The lever F, is provided with an opening through which the standard E, passes. Two rods $a, a$, connect the lever and the rubber together, as is shown in Fig. 1. These rods $a, a$, stand in an inclined position at all times—though they change the angle of inclination at each stroke of the lever when the machine is being operated. When the lever is raised the rods move toward a vertical position giving as they move the rubber a partial rotation. When the lever is forced down again the rods assume a more inclined position and cause the rubber to partially rotate back again.

In washing the clothes are placed between the rubber and the bottom of the tub, and the lever is raised and lowered, so as to give the rubber a constantly backward and forward partial rotary motion. The spring C, rests upon the top of the rubber and against the lever—surrounding the standard E. By means of this spring I have a constant pressure upon the clothes, while being washed.

Having thus fully described my invention what I claim as new and desire to secure by Letters Patent is not the parts herein named generally but

The arrangement of the tub A, support H, lever F, standard E, and rods $a, a$, with the rubber D, and spring C, when said spring is so secured between the lever and the rubber that increased pressure will be added to the said rubber as the rods $a, a$, assume a greater inclination, and when it assists in returning the rubber to its normal position and elevating the lever, substantially as specified.

BURGAN B. WESCOTT.

Witnesses:
B. F. STEELE,
SAMUEL PORTER.